(12) United States Patent
Kay

(10) Patent No.: US 11,267,324 B2
(45) Date of Patent: Mar. 8, 2022

(54) ROOF COVER DUCTS

(71) Applicant: McLaren Automotive Limited, Surrey (GB)

(72) Inventor: Andrew Kay, Hook (GB)

(73) Assignee: McLaren Automotive Limited, Surrey (GB)

( * ) Notice: Subject to any disclaimer, the term of this patent is extended or adjusted under 35 U.S.C. 154(b) by 15 days.

(21) Appl. No.: 16/460,345

(22) Filed: Jul. 2, 2019

(65) Prior Publication Data

US 2020/0009953 A1    Jan. 9, 2020

(30) Foreign Application Priority Data

Jul. 6, 2018  (GB) ..................................... 1811172

(51) Int. Cl.
*B60J 7/22* (2006.01)
*B60J 7/20* (2006.01)
*B62D 35/00* (2006.01)

(52) U.S. Cl.
CPC ............... *B60J 7/223* (2013.01); *B60J 7/201* (2013.01); *B62D 35/007* (2013.01); *B60J 7/20* (2013.01)

(58) Field of Classification Search
CPC ............ B60J 7/20; B60J 7/226; B62D 35/007
USPC ................... 296/107.8, 208, 180.1
See application file for complete search history.

(56) References Cited

U.S. PATENT DOCUMENTS

| 5,988,729 | A | 11/1999 | Klein | |
| 7,172,236 | B1* | 2/2007 | Chevtsov | B60J 7/1678 |
| | | | | 296/107.17 |
| 9,636,977 | B2* | 5/2017 | Matsumoto | B60J 7/146 |
| 10,618,389 | B2* | 4/2020 | Oliver | B60J 10/80 |
| 2011/0001329 | A1* | 1/2011 | Froeschle | B62D 35/008 |
| | | | | 296/76 |
| 2016/0272257 | A1* | 9/2016 | Mckillen | B60K 11/08 |

FOREIGN PATENT DOCUMENTS

| EP | 1690715 A1 | 8/2006 |
| EP | 2269852 | 1/2011 |
| FR | 2882020 A1 | 8/2006 |

(Continued)

OTHER PUBLICATIONS

European Search Report in EP Appln. No. 19184440.6-1015, dated Dec. 2, 2019, 8 pages.

(Continued)

*Primary Examiner* — Dennis H Pedder
*Assistant Examiner* — Joyce Eileen Hill
(74) *Attorney, Agent, or Firm* — Fish & Richardson P.C.

(57) ABSTRACT

A vehicle comprising: an occupant cabin; a retractable roof configured to move between a deployed configuration where the roof covers the occupant cabin and a retracted configuration; a housing configured to house the retractable roof when the roof is in the retracted configuration; and a moveable cover configured to close the housing, the moveable cover comprising: a cover body; and two fins each extending from the cover body, the fins being located on either side of a longitudinal centreline of the vehicle, and the fins each comprising a channel running through the fin from a first side of the fin facing away from the longitudinal centreline to a second side of the fin facing towards the longitudinal centreline.

15 Claims, 5 Drawing Sheets

(56) References Cited

FOREIGN PATENT DOCUMENTS

| GB | 2457034 A | | 8/2009 | |
|---|---|---|---|---|
| GB | 2479363 A | | 10/2011 | |
| GB | 2528926 A | * | 2/2016 | ........... B62D 35/005 |
| IT | TO20100206 | | 9/2011 | |
| WO | WO 2006/045908 A1 | | 5/2006 | |

OTHER PUBLICATIONS

UK Search Report for corresponding GB1811172.4, dated Nov. 30, 2018.
Peugeot 206 CC Cabrio 1.6 80kW—auto24.lv, dated Jun. 12, 2018 http://eng.auto24.lv/lietoti/peugeot/206_cc/832563.

* cited by examiner

ROOF COVER DUCTS

CLAIM OF PRIORITY

This application claims priority under 35 USC § 119(e) to G.B. Patent Application Serial No. GB1811172.4, filed on Jul. 6, 2018, the entire contents of which are hereby incorporated by reference.

This invention relates to a vehicle comprising a moveable cover, for a retractable roof housing, that has aerodynamic channels.

Many cars are fitted with retractable roofs. These roofs tend to come in two types: a soft-top retractable roof and a hard-top retractable roof. Soft-top retractable roofs are generally constructed from a frame and flexible material. The soft-top roof can retract into a retracted configuration by means of the flexible material folding up to permit the parts of the frame to move together and thus take up less room. Hard-top retractable roofs are generally constructed from one or more roof elements that are attached to support members which permit motion of the roof element(s) relative to each other and the rest of the vehicle. These roof element(s) can thus be moved into a retracted configuration by means of movement of the roof elements so that they move from covering the occupant cabin of the vehicle to being packed in a housing so that they no longer cover the occupant cabin.

The retractable roof is generally stored in a housing located rearward of the occupant cabin when the retractable roof is in the retracted configuration. This housing generally has a cover which covers the housing and thus covers the retractable roof when in the retracted configuration. The cover is usually a moveable cover so that it can move to an open position to allow the retractable roof to move between a deployed configuration and the retracted configuration.

The vehicle can have a rear window which fits at the rear of the retractable roof. This rear window may move to permit movement of the retractable roof between its deployed configuration and retracted configuration.

The shape that the retractable roof and the rear window can take is generally limited by the ability of the retractable roof to move to the retracted configuration and be stored within the housing. This design restriction can cause undesirable aerodynamic features on cars with retractable roofs. This can effect the performance of the vehicle, which can be highly relevant to high-performance cars that can typically have retractable roofs, and also mean that components may need to be strengthened to be capable of handling these undesirable aerodynamic effects, which means parts of the car may need to be made heavier as a result which is especially undesirable to the design of high-performance cars.

Therefore, it would be desirable to have a vehicle with a retractable roof that has improved the aerodynamic features.

According to a first aspect of the present invention there is provided a vehicle comprising: an occupant cabin; a retractable roof configured to move between a deployed configuration where the roof covers the occupant cabin and a retracted configuration; a housing configured to house the retractable roof when the roof is in the retracted configuration; and a moveable cover configured to close the housing, the moveable cover comprising: a cover body; and two fins each extending from the cover body, the fins being located on either side of a longitudinal centreline of the vehicle, and the fins each comprising a channel running through the fin from a first side of the fin facing away from the longitudinal centreline to a second side of the fin facing towards the longitudinal centreline.

Each channel may originate in an inlet on the first side of the fin, and the inlet may be oriented towards a forward direction of the vehicle. Each channel may originate in an inlet on the first side of the fin, and at least a portion of the channel at the inlet may continue the profile of vehicle bodywork adjacent to the inlet.

Each channel may originate in an outlet on the second side of the fin, and the outlet may be oriented towards the longitudinal centreline of the vehicle. Each channel may originate in an outlet on the second side of the fin, and the outlet may be oriented towards a rearward direction of the vehicle. When rearward flowing air passes into the channel, the channel may guide the airflow towards a region of the cover body in line with the longitudinal centre line of the vehicle. The fins may project from the cover body. The retractable roof may comprise a rear edge, and the fins may meet the retractable roof along portions of the rear edge of the retractable roof when the retractable roof is in the deployed configuration.

The vehicle may comprise a rear window, the rear window may be located between the two fins. The rear window may run between the two fins. The rear window may be substantially perpendicular to a plane generally defined by the extension of the retractable roof in the longitudinal direction of the vehicle when the retractable roof is in the deployed configuration. The fins may each comprise a projection from the cover body and a panel attached to the projection. The panel may be attached to the cover body, the attachment to the cover body may be remote from the attachment of the panel to the projection. The attachment of the panel to the cover body may be separate to the attachment of the panel to the projection. The panel may be attached to the cover body rearwardly from the attachment of the panel to the projection. The channel may run between the projection from the cover body and the panel. The panel of each fin may comprise a transparent section.

The fins may each comprise a transparent section. The transparent section may be seen through from the occupant cabin. The moveable cover may be configured to move between a closed configuration where the moveable cover closes the housing and an open configuration to permit the retractable roof to move between the deployed configuration and the retracted configuration, the cover body and two fins moving as part of the moveable cover.

The present invention will now be described by way of example with reference to the accompanying drawings. In the drawings.

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention relates to a vehicle comprising an occupant cabin and a retractable roof configured to move between a deployed configuration where the roof covers the occupant cabin and a retracted configuration. The retractable roof does not cover the occupant cabin in the retracted configuration. The vehicle comprises a housing configured to house the retractable roof when the roof is in the retracted configuration. The vehicle comprises a moveable cover configured to close the housing. The moveable cover comprises: a cover body; and two fins each extending from the cover body. The fins are located on either side of a longitudinal centreline of the vehicle, and the fins each comprise a channel running through the fin from a first side of the fin facing away from the longitudinal centreline to a second side of the fin facing towards the longitudinal centreline.

Figure 1:
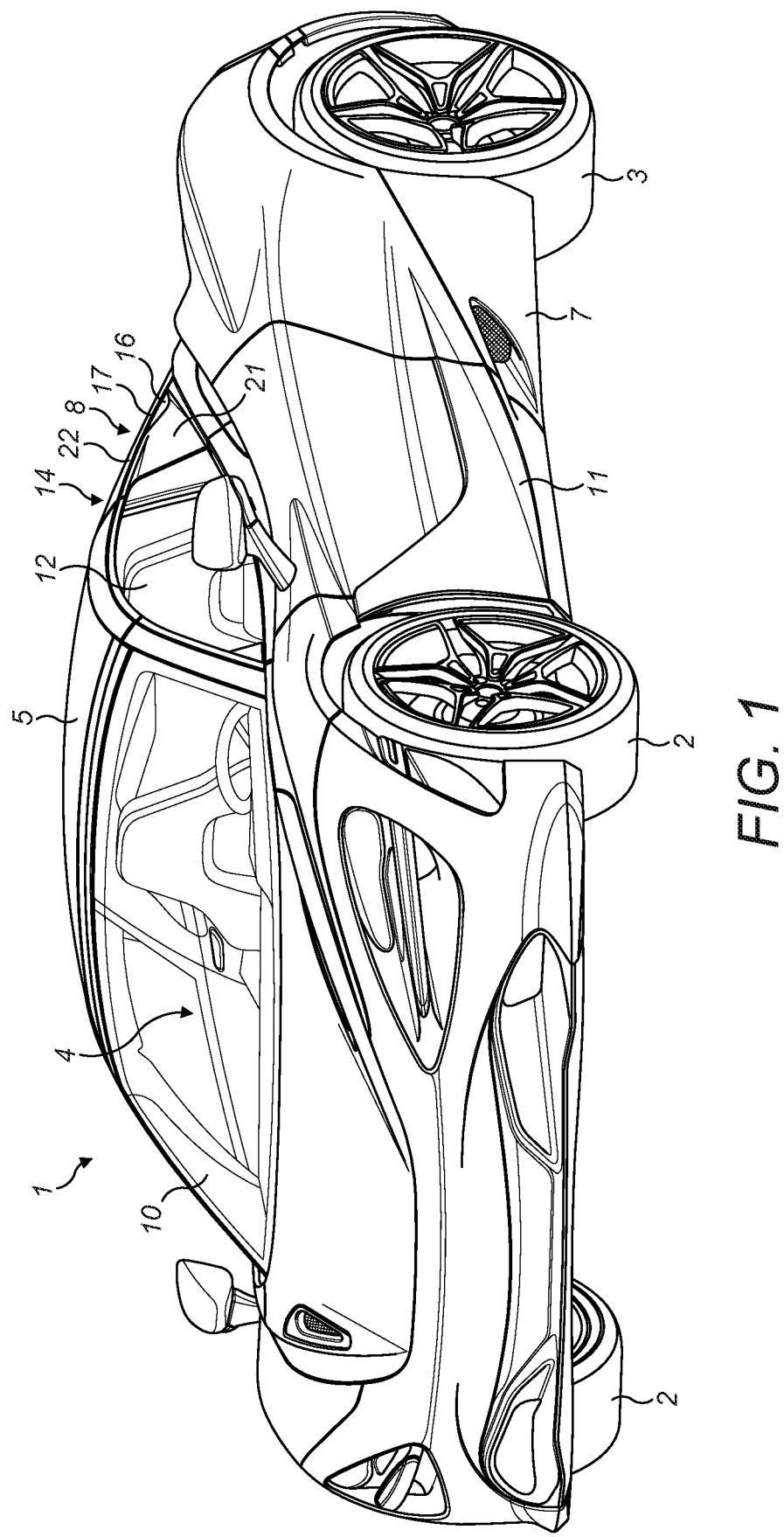
FIG. 1 shows a front three-quarters view of a vehicle comprising a retractable roof in a deployed configuration.
Figure 2:
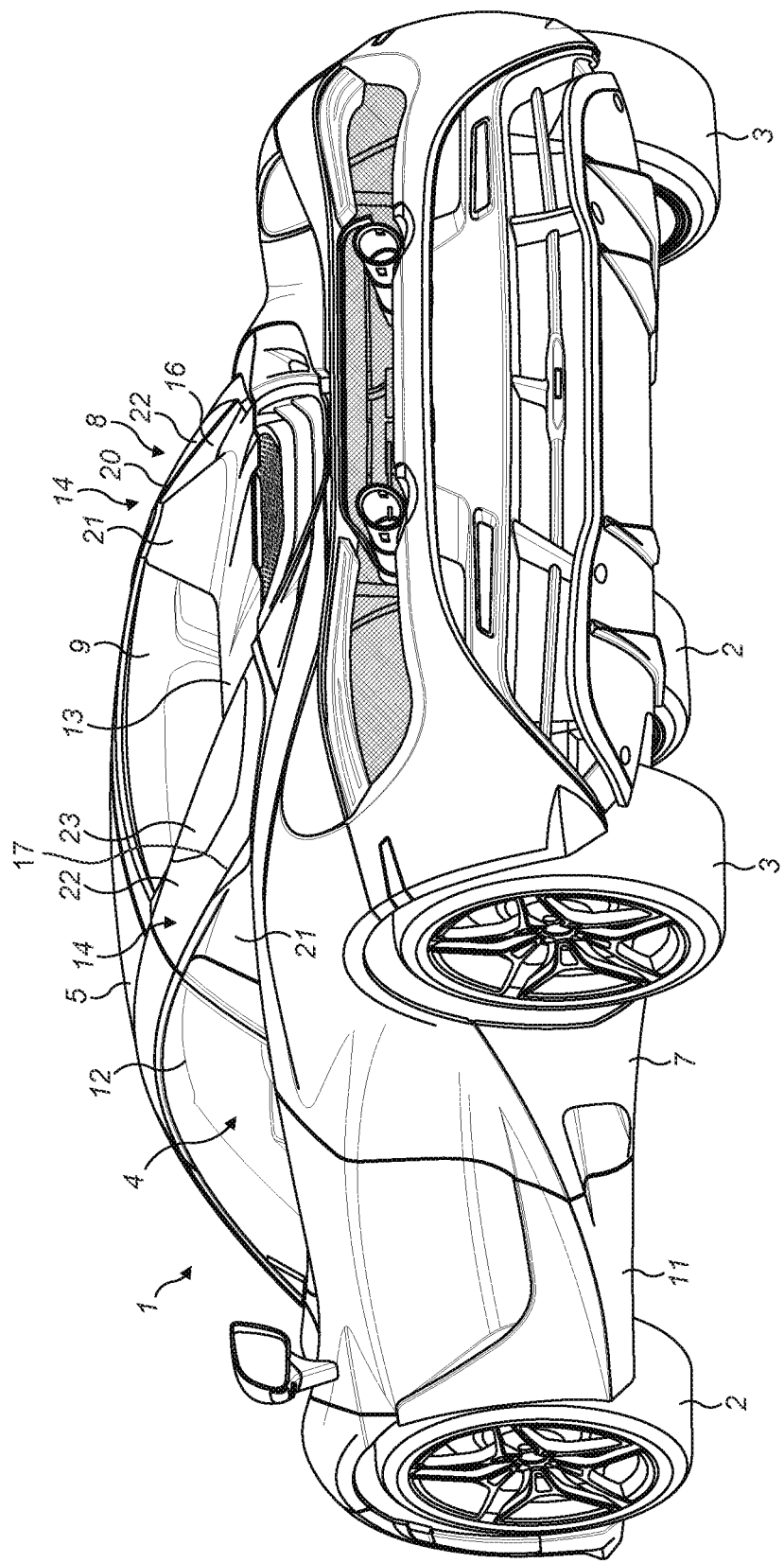
FIG. 2 shows a rear three-quarters view of the vehicle comprising a retractable roof in a deployed configuration.

FIGS. 1 and 2 show a vehicle 1 having a retractable roof shown in its deployed configuration. The vehicle 1 may be a car. The vehicle 1 may be a road vehicle. The vehicle 1 comprises front wheels 2 and rear wheels 3. The front of the vehicle 1 is defined with reference to the primary motion direction of the vehicle 1. The front of the vehicle 1 points in the primary motion direction of the vehicle. Generally, a vehicle has a primary motion direction that is the forward direction. The vehicle 1 comprises an occupant cabin 4. The occupant cabin 4 may comprise one or more seats for occupants of the vehicle to sit in. As shown in FIGS. 1 and 2, the vehicle 1 comprises two seats. The vehicle 1 may comprise a single row of seats as shown in FIGS. 1 and 2. The vehicle 1 may comprise controls located within the occupant cabin 4 to enable an occupant to control the motion of the vehicle.

Figure 3:
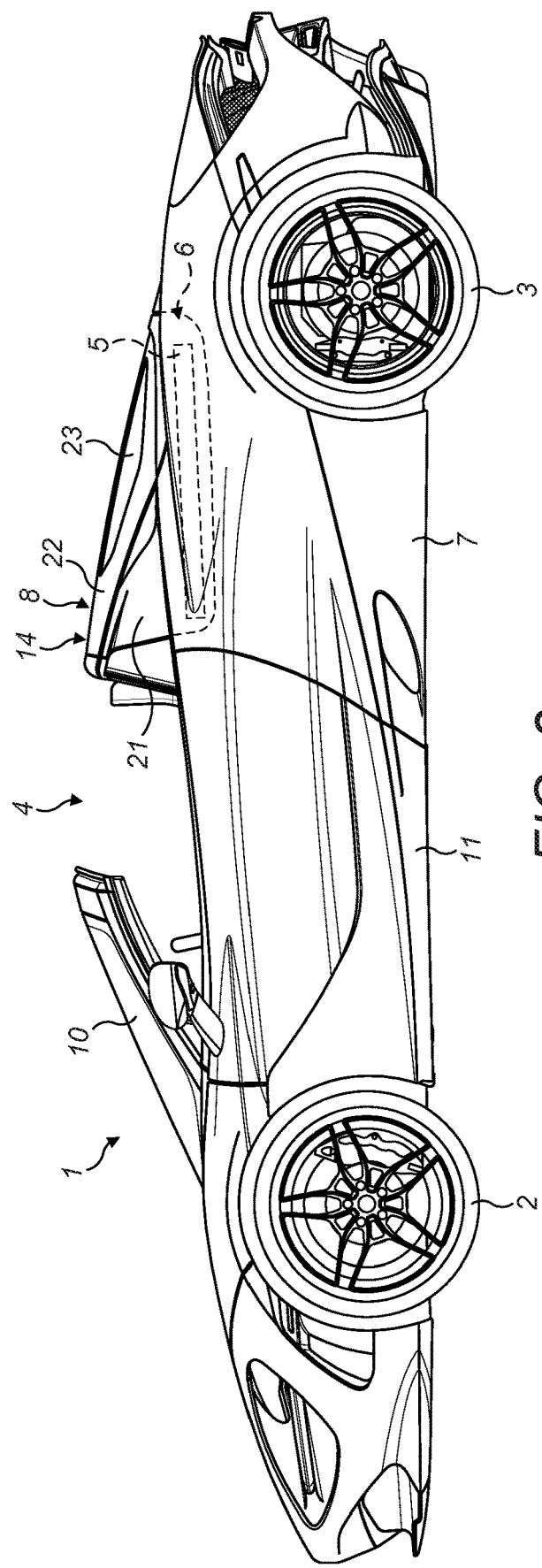
FIG. 3 shows a side view of the vehicle comprising a retractable roof in a retracted configuration.

The vehicle 1 comprises a retractable roof 5. The retractable roof 5 is configured to move between a deployed configuration as shown in FIGS. 1 and 2 and a retracted configuration as shown in FIG. 3. The retractable roof 5 may be a hard-top retractable roof 5 as shown in FIGS. 1 and 2. The retractable roof 5 shown in FIGS. 1 and 2 comprises a single roof element 5 that is moveable between a deployed configuration where the roof element 5 covers the occupant cabin 4 and a retracted configuration where the roof element 5 does not cover the occupant cabin 4. The retractable roof 5 may comprise multiple roof elements that together form the roof of the vehicle. These roof elements may be positioned next to one another to form the roof of the vehicle. The number and configuration of the roof elements is dependent on the size and shape of the occupant cabin 4 that needs to be covered by the retractable roof 5. The movement of the retractable roof 5 is controlled by one or more actuators that are coupled to the retractable roof 5 to permit movement of the roof elements between the deployed configuration and the retracted configuration. The actuators may be coupled to the retractable roof by one or more linkages. The actuators may be hydraulic and/or electric. The hard-top retractable roof may comprise all rigid roof members or may comprise some flexible roof members together with rigid roof members.

Alternatively, the retractable roof 5 may be a soft-top retractable roof. The retractable roof may comprise one or more flexible roof members that are supported by a frame. The frame may be moveable to permit the retractable roof to move between the deployed configuration and the retracted configuration. The frame may be coupled to one or more actuators to permit movement of the frame and thus the retractable roof.

Figure 4:
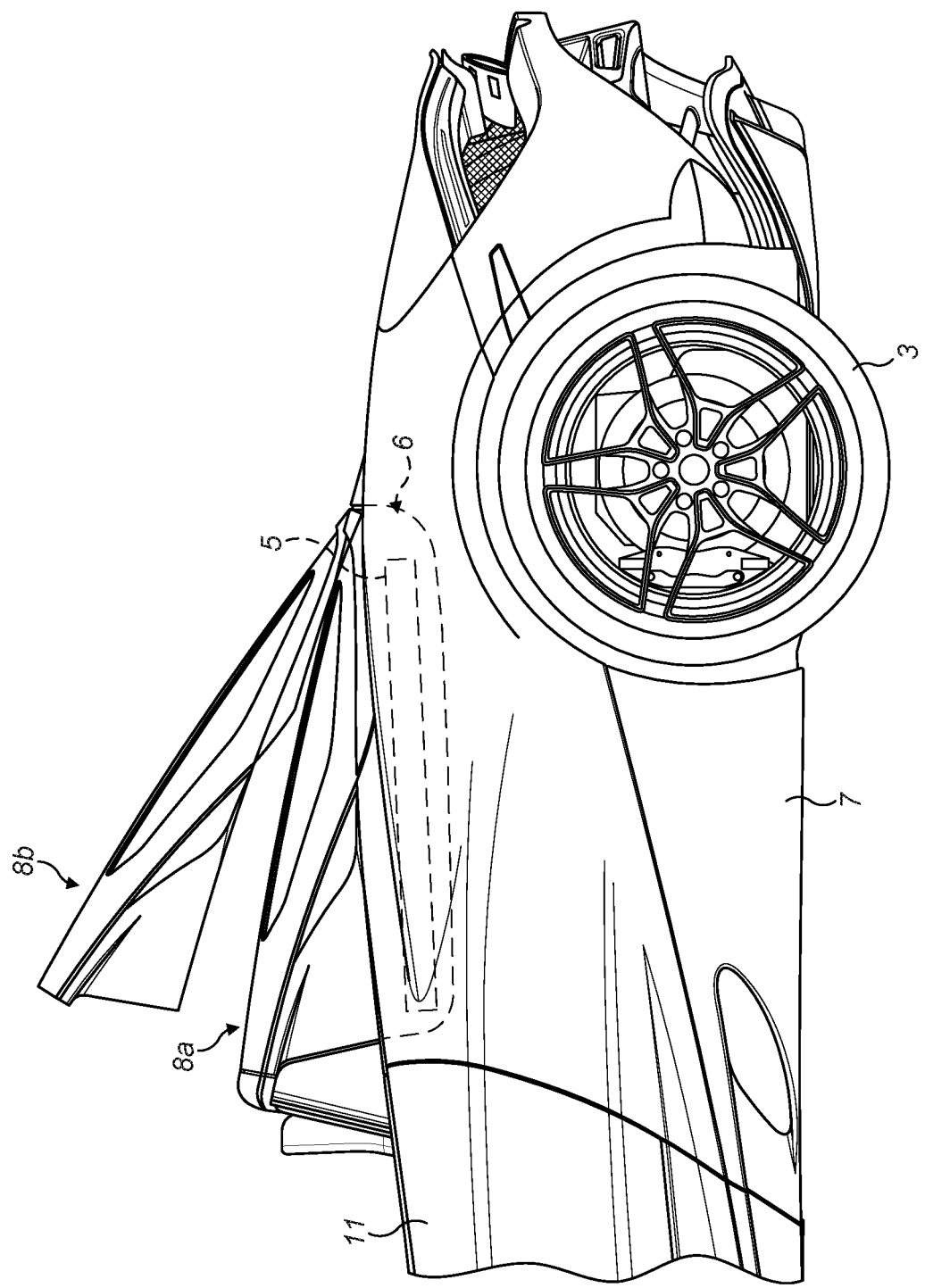
FIG. 4 shows a side view of a rear portion of the vehicle comprising a retractable roof in a retracted configuration and illustrating a moveable cover in a closed configuration and an open configuration.
Figure 5:
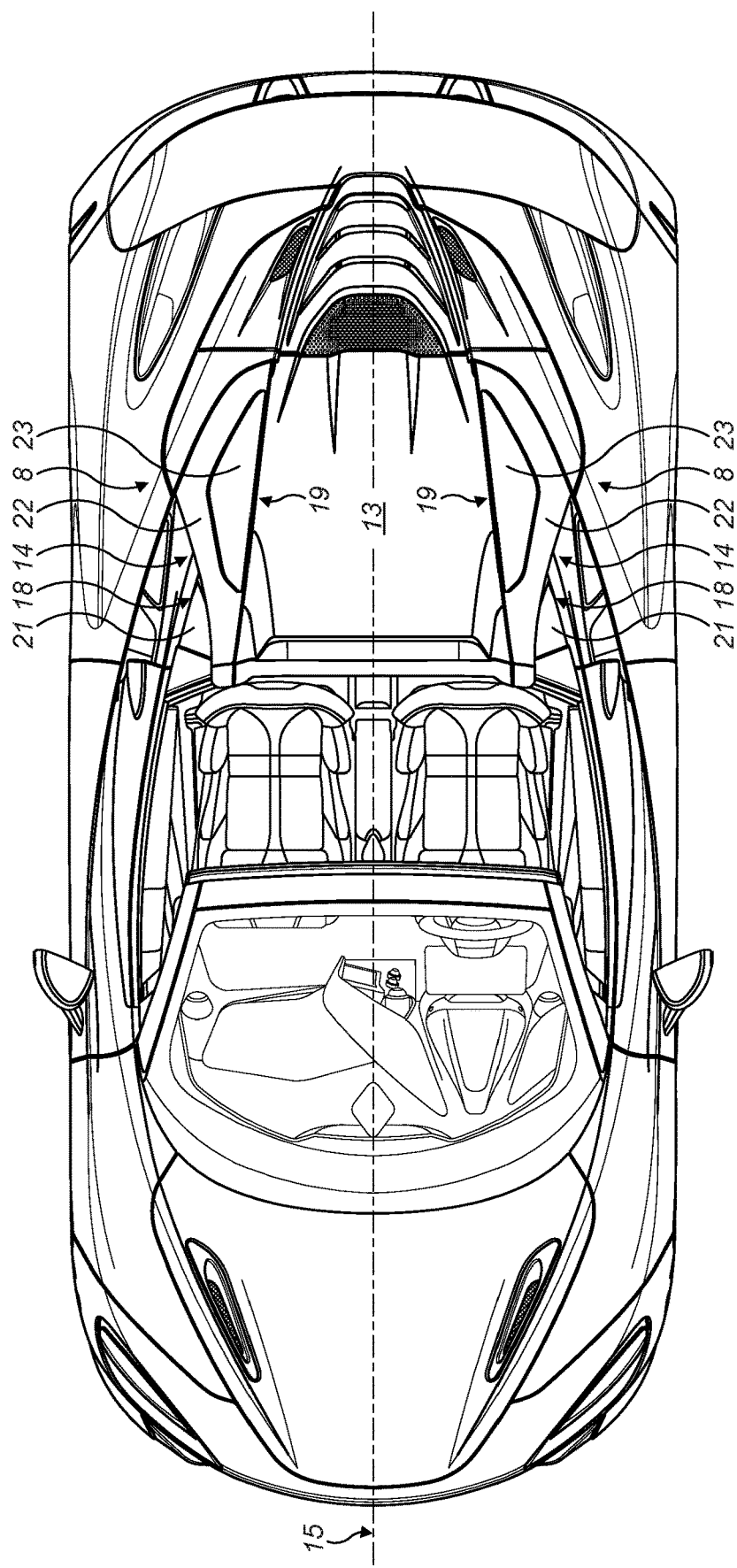
FIG. 5 shows a plan view of the vehicle comprising a retractable roof in a retracted configuration.

FIGS. 3, 4 and 5 show the vehicle 1 having a retractable roof 5 shown in its retracted configuration. The vehicle 1 comprises a housing 6 that is configured to house the retractable roof when the roof is in the retracted configuration. It is shown schematically in FIG. 3 because it is located within the vehicle body 7 and beneath moveable cover 8. Housing 6 may be a discrete housing and/or may be formed from body panels of the vehicle body 7 that also serve another purpose. For instance, covering an engine bay. FIG. 3 shows the retractable roof in its retracted configuration as shown by the schematic representation of the retractable roof located within housing 6. The housing 6 may be shaped to receive the retractable roof. The housing 6 may be sized so as to accommodate the retractable roof element(s) together with the associated linkages and actuators.

The vehicle 1 comprises a moveable cover 8. The moveable cover 8 closes the housing so that when the retractable roof 5 is in the retracted configuration the retractable roof 5 is enclosed in a space defined by the housing 6 and the underside of the movable cover 8. The moveable cover 8 may comprise seals to seal the moveable cover 8 to other body panels of the vehicle body 7 and/or to the housing 6.

FIG. 4 shows the moveable cover 8 in two configurations. The moveable cover 8 is configured to move between a closed configuration 8a where the moveable cover closes the housing and an open configuration 8b where the moveable cover 8 can permit the retractable roof to move between the deployed configuration and the retracted configuration. In the open configuration 8b the front of the moveable cover 8 is raised to permit access to the housing. The raising of the front of the moveable cover 8 permits the retractable roof to move through the space located between the front of the moveable cover 8 and the rest of the vehicle body 7 so that it can move into and out of the housing 6.

The vehicle 1 comprises a rear window 9. The rear window 9 may be configured to move along a direction generally defined by the plane of the rear window 9. The rear window 9 can move between a retracted position where it is either fully or partially housed within the vehicle body and a deployed position where it projects from the vehicle body and, if the roof 5 is in the deployed position, seals against the rear edge of the roof 5. The movement of the window 9 can assist in the movement of the retractable roof 5 between the deployed configuration and the retracted configuration. The window 9 may partially or fully retract into the vehicle body whilst and/or during the movement of the retractable roof 5.

The vehicle 1 also comprises a windscreen 10 through which the occupants of the vehicle 5 can look to see out of the vehicle 5. The windscreen 10 is located forward of the occupant cabin 4. The vehicle comprises two doors 11, one to each side of the vehicle 5. The doors 11 open to permit the occupants to enter and exit the vehicle. The doors each comprise a door glass 12 through which the occupants of the vehicle 5 can look to see out of the vehicle 5. Each door glass 12 is moveable between a retracted position and a deployed position. It will be appreciated that the vehicle 1 may comprise more than two doors depending on the seat configuration of the occupant cabin 4.

When the vehicle 1 is moving in a forward direction, a rearwardly moving airflow flows over the vehicle body 7. The movement of the vehicle 1 causes a rearwardly moving airflow over the windscreen 4 of the vehicle 1. This airflow tends to streamline over the surface of the vehicle body 7 and so, when the retractable roof 5 is in the deployed position, the airflow from the windscreen 4 passes over the retractable roof 5. Due to the need for a retractable roof to be capable of being housed within the vehicle body in the retracted position the shape that the retractable roof 5 can take is generally limited. This means that, as shown in FIG. 2, the rear of the retractable roof 5 tends to finish abruptly with a rear window glass 9 that is generally perpendicular to the general plane defined by the retractable roof 5. Such a design of roof 5 means that when the airflow (generated by forward vehicle motion) reaches the rear edge of the retractable roof 5 the airflow separates from the vehicle body. This is because the change in direction of the vehicle body 7 at this point is too great for the airflow to continue to streamline to the vehicle body 7. Such a change in direction can usually cause turbulent airflow behind the rear window 9 of the vehicle. This turbulent airflow would alter the pressure of the region behind the rear window 9 and thus on top of the moveable cover 8. Such an alteration in pressure may cause a reduction in pressure over the moveable cover 8, which as a general point can reduce the downforce generated by the vehicle and/or introduce additional drag, but can specifically mean that the moveable cover 8 is subjected to unpredictable forces on the moveable cover 8 caused by the turbulent airflow. This can mean that the moveable cover 8 needs to be strengthened to be able to be subjected to those forces. Such strengthening can add to the weight of the moveable cover 8 which adds to the weight of the vehicle and thus reduces the performance of the vehicle. Additionally, the strengthening may increase the size of the moveable cover 8 which can cause packaging issues.

To address this problem, the moveable cover 8 of the vehicle 1 is shaped to reduce and/or prevent the turbulent air being generated behind the rear window 9 of the vehicle 1. The moveable cover 8 is shaped so as to guide the air flowing over the sides of the vehicle body 7, and specifically over doors 11, during forward movement of the vehicle 1 to the region of the vehicle body behind the rear edge of the retractable roof 5, and thus to the region of the vehicle body behind the rear window 9. This region is also located on and above the upward facing surface of moveable cover 8.

The moveable cover 8 comprises a cover body 13. The cover body 13 forms the base of the moveable cover 8. The cover body 13 forms the deck of the vehicle body 7 behind the rear of the retractable roof 5. Beneath the cover body 13 is the housing 6 for the retractable roof 5. The moveable cover 8 also comprises two fins 14. The fins 14 each extend from the cover body 13. The fins 14 each project from the cover body 13. The fins 14 project in a generally direction generally perpendicular to the cover body 13. In this way, the fins 14 project in a generally vertical direction. The fins 14 are located on either side of a longitudinal centreline 15 of the vehicle 1.

The fins 14 are shaped to direct a rearward airflow flowing over the sides of the vehicle body to a region of the vehicle body that is located behind the rear edge of the retractable roof 5 when the retractable roof 5 is in the deployed position. In other words, the fins 14 are shaped to direct a rearward airflow flowing over the sides of the vehicle body towards the region of space located vertically adjacent to the cover body 13. The fins 14 are shaped to direct a rearward airflow flowing over the sides of the vehicle body towards the longitudinal centreline 15 of the vehicle 1. To achieve this in the configuration shown in the figures, the fins 14 each comprise a channel running through the fin 14. This channel 16 is configured to direct a rearward airflow flowing over the sides of the vehicle body to a region located adjacent to the cover body 13 in the region of the cover body 13 centred on the longitudinal centreline 15 of the vehicle 1. The channel runs through the fin 14 from a first side 18 of the fin 14 facing away from the longitudinal centreline 15 of the vehicle 1 to a second side 19 of the fin 14 facing towards the longitudinal centreline 15 of the vehicle 1.

Each channel 16 originates in an inlet 17 on the first side 18 of the fin 14. The inlet 17 is generally oriented towards the forward direction of the vehicle 1. This means that a rearward airflow passing over the sides of the vehicle body can be guided into the channel by the inlet 17. As shown in the figures, at least a portion of the channel 16 at the inlet 17 continues the profile of the vehicle bodywork adjacent to the inlet. Thus, permitting the airflow to flow into the channel 16. The channels 16 are air ducts.

Each channel 16 originates in an outlet 20 on the second side 19 of the fin 14. The outlet 20 is generally oriented towards the longitudinal centreline of the vehicle. The outlet 20 may be oriented towards a region of the cover body located on the longitudinal centreline 15 of the vehicle 1. The direction of the outlet 20 causes a rearward airflow through the channel 16 to be directed to the region of the vehicle body located around the longitudinal centreline 15 of the vehicle 1 behind the rear edge of the retractable roof 5 (when the roof 5 is in the deployed position). The outlet 20 may also be directed towards the rearward direction of the vehicle 1.

As shown in FIG. 2, the rear window 19 runs between the two fins 14. The rear window 19 runs between the leading edge of the two fins 14. The fins 14 may each comprise a channel through which the edges of the rear window 9 run.

As shown in the figures, the fins 14 are constituted by multiple parts. The fins 14 comprise a projection 21 from the cover body 13. This projection 21 may be integral with the cover body 13 but extend from the cover body 13 in a direction generally perpendicular to the cover body 13. The fins 14 comprise a panel 22 attached to the projection 21. The panel 22 runs between the projection 21 and a region of the cover body 13 remote from the projection 21. The panel 22 is attached to the cover body 13 at the region of the cover body 13 remote from the projection. The attachment of the panel 22 to the cover body is separate to the attachment of the panel 22 to the projection 21. The panel 22 is attached to the cover body 13 rearwardly to where the panel 22 is attached to the projection 21. The channel 16 runs between the projection 21 from the cover body 13 and the panel 22.

As shown in FIGS. 1 and 2, when the roof 5 is in the deployed configuration, each of the fins 14 meets with the retractable roof 5 along portions of the rear edge of the retractable roof 5. This means that rearward airflow over the outer portions of the roof 5 can flow down the top surface of the fins. Thus meaning that those portions of the rearward airflow are streamlined down the rear of the vehicle body 7.

The panel 22 of each fin 14 can comprise a transparent section 23. The transparent section 23 may be located so that it can be seen through from the occupant cabin 4. This is advantageous because it means that the fins 14 can provide their aerodynamic benefit whilst not being an impediment to rearward visibility from the occupant cabin 4. The panel 22 may be a transparent panel which has been made opaque in the parts of the panel that are not the transparent section 23. The panel 22 may be a glass panel.

The vehicle may be a mid- or rear-engined vehicle, for instance a mid- or rear-engined car, or sports car. The above configuration is advantageous in such a vehicle because of the amount of space behind the occupant cabin that is taken up by engine related components. This meant that the rear deck of the vehicle 1 can be relatively large, compared to front engined vehicles, and hence so can the moveable cover 8. This means that the region where airflow can be improved by the above design of moveable cover 8 is significant and thus cause modifications to be able to be made to the moveable cover 8.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A vehicle comprising:
   an occupant cabin;
   a retractable roof configured to move between a deployed configuration where the roof covers the occupant cabin and a retracted configuration;
   a housing configured to house the retractable roof when the roof is in the retracted configuration; and
   a moveable cover configured to close the housing, the moveable cover comprising: a cover body; and two fins each extending from the cover body, the fins being located on either side of a longitudinal centreline of the vehicle, and the fins each comprising a channel running through the fin from a first side of the fin facing away from the longitudinal centreline to a second side of the fin facing towards the longitudinal centreline, wherein each channel originates in an outlet on the second side of the fin, and the outlet is oriented towards a rearward direction of the vehicle,
   wherein the fins are constituted by multiple separate parts, the fins each comprising a first part being a projection from the cover body and a second part being a panel attached to the projection, wherein the panel is attached to the cover body rearwardly from the attachment of the panel to the projection, the channel running between the projection from the cover body and the panel.

2. A vehicle according to claim 1, wherein the outlet is oriented towards the longitudinal centreline of the vehicle.

3. A vehicle according to claim 1, wherein each channel originates in an inlet on the first side of the fin, the inlet being oriented towards a forward direction of the vehicle.

4. A vehicle according to claim 1, wherein each channel originates in an inlet on the first side of the fin, and at least a portion of the channel at the inlet continues the profile of vehicle bodywork adjacent to the inlet.

5. A vehicle according to claim 1, wherein, when rearward flowing air passes into the channel, the channel guides the airflow towards a region of the cover body in line with the longitudinal centerline of the vehicle.

6. A vehicle according to claim 1, wherein the fins project from the cover body.

7. A vehicle according to claim 1, wherein the retractable roof comprises a rear edge, and the fins meet the retractable roof along portions of the rear edge of the retractable roof when the retractable roof is in the deployed configuration.

8. A vehicle according to claim 1, the vehicle comprising a rear window, the rear window being located between the two fins.

9. A vehicle according to claim 8, wherein the rear window is substantially perpendicular to a plane generally defined by the extension of the retractable roof in the longitudinal direction of the vehicle when the retractable roof is in the deployed configuration.

10. A vehicle according to claim 1, wherein the panel is attached to the cover body, the attachment to the cover body being remote from the attachment of the panel to the projection.

11. A vehicle according to claim 10, wherein the panel of each fin comprises a transparent section.

12. A vehicle according to claim 1, wherein the fins each comprise a transparent section.

13. A vehicle according to claim 12, wherein the transparent section can be seen through from the occupant cabin.

14. A vehicle according to claim 1, wherein the moveable cover is configured to move between a closed configuration where the moveable cover closes the housing and an open configuration to permit the retractable roof to move between the deployed configuration and the retracted configuration, the cover body and two fins moving as part of the moveable cover.

15. A vehicle according to claim 1, wherein an attachment of the panel to the cover body is separate from the attachment of the panel to the projection.

* * * * *